(12) United States Patent
Kuroda

(10) Patent No.: US 7,586,697 B2
(45) Date of Patent: Sep. 8, 2009

(54) LENS DEVICE AND LENS HOLDING METHOD

(75) Inventor: Yasuto Kuroda, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 292 days.

(21) Appl. No.: 11/644,845

(22) Filed: Dec. 26, 2006

(65) Prior Publication Data

US 2007/0146905 A1  Jun. 28, 2007

(30) Foreign Application Priority Data

Dec. 27, 2005 (JP) ............... 2005-373962

(51) Int. Cl.
*G02B 7/02* (2006.01)
(52) U.S. Cl. ............... 359/819; 359/818; 359/649
(58) Field of Classification Search ............ 359/819
See application file for complete search history.

(56) References Cited

U.S. PATENT DOCUMENTS 5,249,082 A * 9/1993 Newman ............... 359/813
6,529,339 B2 * 3/2003 Maeda et al. ............. 359/811
6,590,720 B2 * 7/2003 Oba ..................... 359/819
2004/0165288 A1 * 8/2004 Daikoku ................ 359/819

FOREIGN PATENT DOCUMENTS

| JP | 2001-209118 | 8/2001 |
| JP | 2005-099116 | 4/2005 |

* cited by examiner

*Primary Examiner*—Jessica T Stultz
(74) *Attorney, Agent, or Firm*—Young & Thompson

(57) ABSTRACT

A lens device comprises a lens element having round depressions formed in the back thereof and a lens barrel provided with round projections formed correspondingly in position to the round depressions each of which has an axial length shorter than an axial depth of the round depression and an outer diameter smaller than an inner diameter of the depression. The lens element is held in the lens barrel with the round projections received in the round depressions, respectively.

6 Claims, 2 Drawing Sheets

LENS DEVICE AND LENS HOLDING METHOD

BACKGROUND OF THE INVENTION

1. Field of the invention

The present invention relates to a lens device comprising a lens holding barrel and a lens element held in the lens holding barrel.

2. Description of Related Art

In recent years, because of a strong demand for a high optical performance and a decreased number of lens elements of a projection lens system for a liquid crystal projector and mass productivity of a lens element even having a complicated shape, it is usual to employ aspherical plastic lens elements made by injection molding. The problem encountered by such a plastic lens element is that, in the case where a clearance between a lens barrel and the plastic lens element is too small, the plastic lens element fails to be snugly installed in the lens barrel or causes deterioration in lens performance due to distortion even if it is forced in the lens barrel. On the other hand, in the case where the plastic lens element is large in diameter than the lens barrel, the plastic lens element is unstable, more specifically turns, in the lens barrel unless secured to the lens barrel with, for example, an adhesive. Generally, even when a glass lens element turns in the lens barrel, there are no problems unless the optical axis is out of alignment. However, when the plastic lens element of a liquid crystal projector lens system turns in the lens barrel, the potential problem is that the plastic lens element has an adverse effect on its optical performance such as an occurrence of distortion of a projected image even if the optical axis remains aligned regardless of turning of the plastic lens element in the lens barrel. This is because the injection molding is difficult to form a plastic lens element with a sufficient precision of shape at a location close to a gate of the mold, leading to formation of local irregularities in shape which gives birth to the distortion.

There have been known various structures for position adjustment of a lens element with respect to an axis of a lens system such as described in, for example, Japanese Unexamined Patent Publication Nos. 2001-209118 and 2005-99116. According to the lens position adjusting structure described in Japanese Unexamined Patent Publication No. 2001-209118, a plastic lens comprises a lens portion and mechanical elements such as positioning racks, adjusting slide portions and a handgrip for adjusting work which are formed as integral parts of the lens portion and form parts of the lens position adjusting mechanism. This lens position adjusting structure is simplified in structure and enabled to perform lens position adjusting work without using a tool. According to the lens position adjusting structure described in connection with a projection lens device which comprises a lens barrel and a projection lens system arranged in an optical path defined in the lens barrel in Japanese Unexamined Patent Publication No. 2005-99116, at least one lens element of the projection lens system which is provided with an annular flange formed as an integral part of a lens portion thereof is adjusted in position three-dimensionally through an access hole formed in a peripheral wall of the lens barrel and fixed within the lens barrel with an adhesion injected through an injection hole formed in the peripheral wall of the lens barrel. This lens position adjusting structure enables precise positioning of the lens element and easy fixation of the lens element in the lens barrel.

However, the problem encountered by the prior art lens position adjusting structures is that the lend element has to have a unique shape and is adjusted in position in troublesome procedure and is poor in versatility and is unfavorable in terms of cost in consequence. More specifically, the first lens position adjusting structure is incompatible with a lens element having a general round shape. On the other hand, the second lens position adjusting structure is not always capable of preventing the lens element from turning after position adjustment unless the lens barrel catches hold of the lens element.

SUMMARY OF THE INVENTION

It is therefore an object of the present invention to provide a lens device comprising a lens barrel and a plastic lens element held in the lens barrel which is capable of preventing the plastic lens element from turning in the lens barrel without fixing them with an adhesive so as thereby to avoid adverse effects on an optical performance of the lens device due to molding accuracy and is provided at a low cost.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which.

DETAILED DESCRIPTION OF THE PREFERRED EMBODIMENTS

In the following description, parts or mechanisms of a projector which are not direct importance to the invention and parts or mechanisms of a projector which are purely of conventional construction will not be described in detail since their construction and operation can be easily be arrived at by those skilled in the art.

Figure 1:
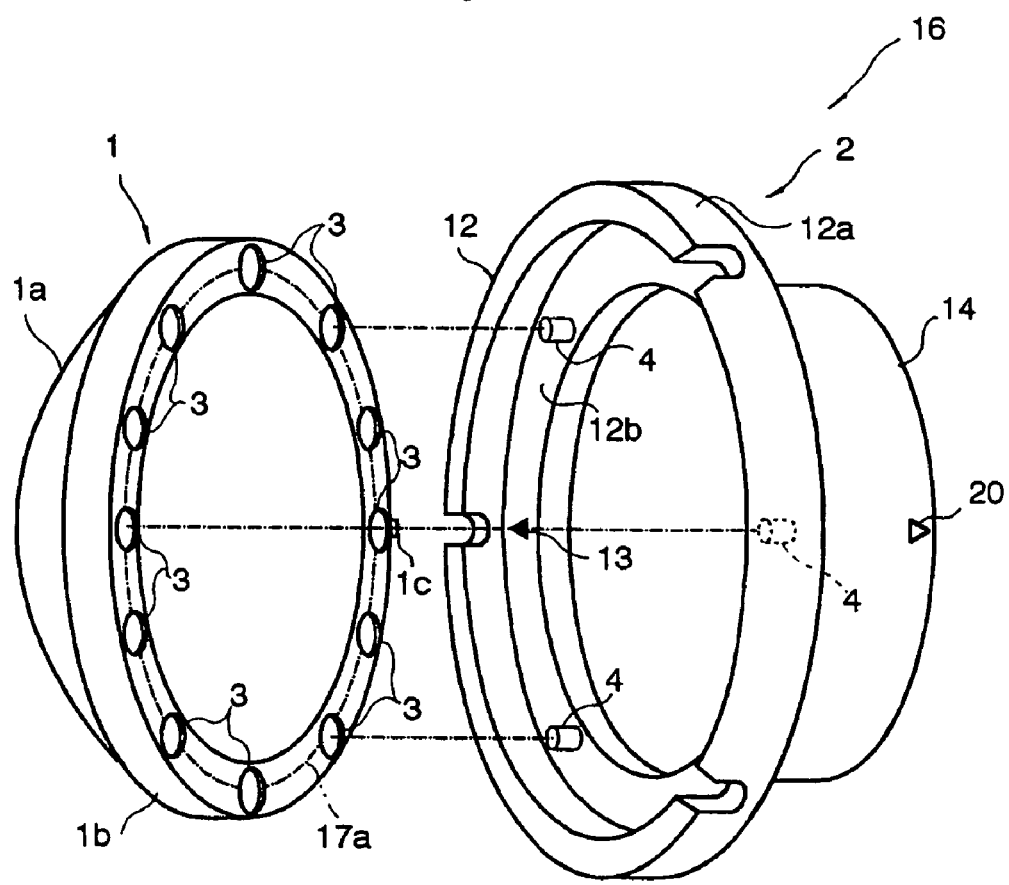
FIG. 1 is a schematic view of a rear projection type projector in which a lens device including a lens barrel according to an embodiment of the present invention is installed.

Referring to the accompanying drawings in detail, and in particular, to FIG. 1 showing a lens device 16 according to an embodiment of the present invention, the lens device 16 comprises an optical lens element 1 and a lens barrel for holding the optical lens element 1. The optical lens element 1 has a concave lens portion 1a and an annular flange portion 1b which are formed as an integral piece plastic lens element by injection molding. The flange portion 1b has a plurality of, more specifically twelve in this embodiment, round depressions 3 formed in the back of thereof The round depressions 3 are equally spaced on the circumference of a circle 17a. The lens barrel 2 for receiving and holding the optical lens element 1, which is formed as a single piece by injection molding, comprises a cylindrical lens holder portion 12 formed by a circumferential annular wall 12a and a medial annular collar 12b for receiving the optical lens element 1 therein and a coupling barrel portion 14 through which the lens barrel 1 is coupled to another lens barrel (not shown). The annular medial collar 12 has a plurality of, more specifically three in this embodiment, round bosses 4 extending forward therefrom and equally separated on the circumference of a circle having a diameter equal to the circle 17a. Each round boss 4 is shorter in axial length than the depth of the round depression 3 and a diameter smaller than the round depression 3 which provides a desired diametrical difference between the round boss 4 and the round depression 3. Further, the number of round depressions 3 of the optical lens element 1 should be an integral multiple of the number of the round bosses 4 of the lens barrel 2.

Figure 2:
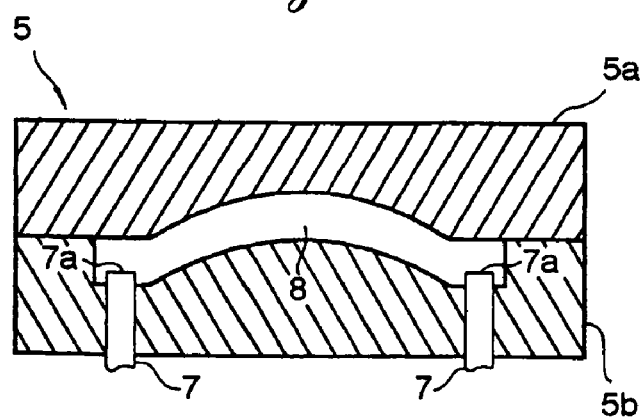
FIG. 2 is a schematic sectional view of the lens device.

Referring to FIG. 2 showing an injection mold 5 comprising top and bottom mold halves 5a and 5b which are matched to form a molding cavity 8 identical in shape with a desired optical lens element therebetween, and a plurality of ejector rods 7 inserted in through bores (not shown) formed and arranged at regular angular intervals in the bottom mold half 5b. Each ejector rod 7 has a head portion 7a which protrudes from the bottom mold half 5b and is shaped in the form of male die for the round depression 3. The head portion 7a has an axial height is substantially equal to the depth of the round depression 3 and may have a diameter equal to or larger than the remaining portion of the ejector rod 7. A molten compound such as a molten resin is poured into the molding cavity 8 of the matched mold 5 to form a plastic lens. After the plastic lens is sufficiently cured in the mold molding cavity 8, the top mold half 5a is detached from the bottom mold half 5b, and then the ejector rods 7 are pushed up from below to lift the plastic lens out of the bottom mold half 5b. In this way, the plastic lens 1 is formed with round depressions in the back of the flange portion whose shapes are transferred from the head portions 7a of the ejector rods 7. The plastic lens element 1 molded by the use of the injection mold 5 has the round depressions 3 formed in the back of the flange portion 1b thereof.

Figure 3:
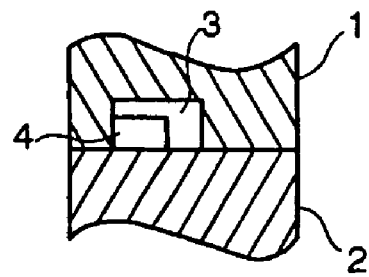
FIG. 3 is a schematic sectional view of a second lens holding barrel of the lens device.

Referring FIG. 3, the optical lens element 1 is received and held in the lens barrel 2 with every four round depressions 3 receiving the round bosses 4 and the flange portion 1b supported in an axial direction by the annular medial collar 12. When the optical lens element 1 is installed in the lens barrel 2, the round bosses 4 received in the respective round depression 3 impose restrictions on circumferential movement of the optical lens element 1 in the lens barrel 2 within the desired diametrical difference between them.

Figure 4:
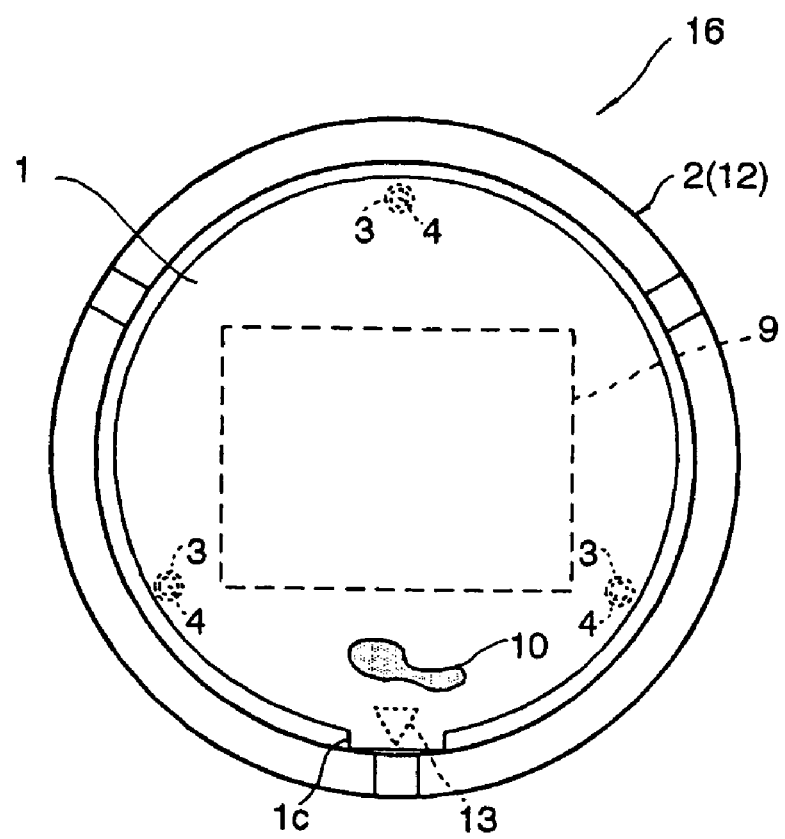
FIG. 4 is a schematic view of the circumferential position adjustment of the lens device.

FIG. 4 shows circumferential position adjustment between the optical lens element 1 and the lens barrel 2. When forming the optical lens element 1 by ordinary injection molding using the matched mold 5 shown in FIG. 2, the optical lens element 1 possibly has mold defects such as concave or convex irregularities 10 somewhere close to a mold sprue 1c of the molded product which is a vestige of a sprue gage of the mold. The mold defects of the optical lens element 1 adversely affect the optical quality of the lens device 16. For example, if the lens device 16 having the optical lens element 1 with a mold defect, i.e. an irregularity 10, formed thereon is incorporated in a projection lens unit of an optical equipment, for example a projector in this embodiment, so that the irregularity 10 has a place within an effective area 9 which is defined by a projection light path of the projector through which light used to project an image passes, the projected image is locally distorted on a screen. It is therefore necessary to adjust the mold sprue 1c of the plastic lens element 1 in position so that the irregularity 10 is laid out of the effective area 9 of the lens portion 11a of the plastic lens element 1 when the plastic lens element 1 is installed in the lens barrel 2. Toward this end, the lens barrel 2 is provided with a lens positioning mark 13 put on the medial annular collar 12b, or otherwise on the circumferential annular wall 12a, which indicates a circumferential position at which the mold sprue 1c is aligned and a barrel position mark 20 at which the lens barrel 2 is aligned with a specified position of the projector when the lens device 16 is coupled to the projector. The lens position mark 13 and the barrel position mark 20 are positioned in a specific relation so that whenever the lens device 16 is coupled to the projector by aligning the barrel position mark with the specific position of the projector, the mold sprue 1c has a place always out of the effective area 9. When installing the plastic lens element 1 in the lens barrel 2, the plastic lens element 1 is put in the cylindrical lens holder portion 12 bringing the mold sprue 1c in alignment with the positioning mark 13. Subsequently, the plastic lens element 1 is fixed in the lens barrel 2 by, for example, a retainer spring after fine position adjustment by a positioning tool. The lens device 16 is coupled to the projector by bringing the barrel position mark 20 into alignment with the specific position of the projector. In this way, the plastic lens element 1 is maintained in a desired circumferential position in the lens barrel 2 throughout the manufacturing process of the projection lens unit, besides being prevented from turning in a circumferential direction through lateral interference between the depressions 3 and the bosses 4. Accordingly, the lens device 16 is prevented from causing a problem due to adverse affects from irregularities formed on the plastic lens element and, in consequence, improved in optical quality. In addition, the lens device 16 is manufactured at a low cost resulting from the simplified structure.

It is to be understood that the number and positions of the bosses 4 is optional as long as the bosses 4 are arranged at regular angular intervals.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens device, comprising:
   a lens element having a substantially cylindrical periphery, said lens element being injection molded in a cavity of a mold having at least one ejector rod extending within said cavity for ejecting said lens element in an axial direction of said lens element; and
   a lens barrel for holding said lens element therein;
   wherein said lens element is molded in a cavity of a mold and has at least one round axial depression formed in a back surface of said substantially cylindrical periphery thereof by transferring a shape of a top end portion of an ejector rod during molding of said lens element and said lens barrel is provided with a round axial projection formed corresponding to a circumferential position of said round axial depression which has an axial length shorter than an axial depth of said round axial depression and an outer diameter smaller than an inner diameter of said round axial depression; and
   said lens barrel holds said lens element therein with said round axial projection received in said round axial depression.

2. A lens device as defined in claim 1, wherein said lens element comprises a plastic lens formed by injection molding.

3. A lens device as defined in claim 1, wherein said lens element forms a part of a projection lens system for a projector.

4. A lens device as defined in claim 3, wherein said lens element comprises a plastic lens formed by injection molding.

5. A lens device as defined in claim 4, wherein said lens element has a mold sprue on said periphery thereof and said lens barrel is provided with a positioning mark, said lens element being positioned by fitting a position of said mold sprue to said mark.

6. A lens device, comprising:

a plastic lens element having an annular flange;

said plastic lens element being injection molded in a cavity of an injection mold having at least one ejector rod for ejecting said lens element in an axial direction of said lens element and having a mold sprue as a flash on a periphery of said annular flange; and a lens barrel having side and bottom surfaces for holding said plastic lens element therein, wherein said plastic lens element has a mark indicating a circumferential position of said mold sprue and a round axial depression formed in a back surface of said substantially annular flange thereof by transferring a shape of a top end portion of said ejector rod during molding of said lens element, and said lens barrel is provided with a round axial projection formed on said bottom surface corresponding to a circumferential position of said round axial depression, said round axial projection having an axial length shorter than an axial depth of said round axial depression and an outer diameter smaller than an inner diameter of said round axial depression so as to be received in said round axial depression.

* * * * *